(12) United States Patent
Chen et al.

(10) Patent No.: US 9,800,003 B1
(45) Date of Patent: Oct. 24, 2017

(54) STANDING STRUCTURE FOR SHELL OF EXTENSION CORD

(71) Applicant: ATTIA TECHNOLOGY INC., Taipei (TW)

(72) Inventors: Wen-Bean Chen, Taipei (TW); Wen-Shun Hsieh, Tainan (TW); Yue-Long Lu, Tainan (TW)

(73) Assignee: Attia Technology Inc., Taipei (TW)

( * ) Notice: Subject to any disclaimer, the term of this patent is extended or adjusted under 35 U.S.C. 154(b) by 0 days.

(21) Appl. No.: 15/271,411

(22) Filed: Sep. 21, 2016

(30) Foreign Application Priority Data

Jun. 20, 2016 (TW) .............................. 105209230 U

(51) Int. Cl.
| | |
|---|---|
| *H01R 13/60* | (2006.01) |
| *H01R 25/00* | (2006.01) |
| *H01R 13/516* | (2006.01) |
| *H01R 27/02* | (2006.01) |
| *H01R 13/70* | (2006.01) |

(52) U.S. Cl.
CPC ......... *H01R 25/006* (2013.01); *H01R 13/516* (2013.01); *H01R 13/70* (2013.01); *H01R 25/003* (2013.01); *H01R 27/02* (2013.01)

(58) Field of Classification Search
CPC .... H01R 13/516; H01R 13/70; H01R 25/003; H01R 27/02

USPC .......... 248/221.11, 223.41, 225.11; 439/527, 439/536, 569
See application file for complete search history.

(56) References Cited

U.S. PATENT DOCUMENTS

| | | | | |
|---|---|---|---|---|
| 6,663,435 | B2* | 12/2003 | Lincoln, III | ......... H01R 25/003 439/115 |
| 2001/0030266 | A1* | 10/2001 | MacDonald | ......... H05K 7/1448 248/65 |
| 2007/0257169 | A1* | 11/2007 | Taggett | .................. A47B 96/06 248/220.41 |

* cited by examiner

*Primary Examiner* — Todd M Epps
(74) *Attorney, Agent, or Firm* — Rosenberg, Klein & Lee

(57) ABSTRACT

A standing structure for a shell of an extension cord is provided. Intercalating trenches are disposed on rear edges of a pair of opposite surfaces of the shell of the extension cord. A support frame includes a horizontally-disposed bottom plate and a vertically-disposed support plate connecting the bottom plate and having two intercalating strips intercalated into the intercalating trenches. Thus, the shell of the extension cord can be combined with the support frame to form the standing structure. The planar surface, not combined with the shell of the extension cord, of the support plate thus can face to a user for hiding power outlets and power cables plugged into the power outlets.

14 Claims, 12 Drawing Sheets

STANDING STRUCTURE FOR SHELL OF EXTENSION CORD

BACKGROUND

Field of Invention

The disclosure relates to a standing structure for a shell of an extension cord. More particularly, the disclosure relates to a novel structure hiding power outlets and power cables inserted into the power outlets and showing a neat and order surface to a user.

Description of Related Art

Generally, power outlets disposed on walls of buildings usually have two or three ports. However, the number of the using electrical devices in home or office is usually more than two or three, so that users cannot use all of the electrical devices at one time. Moreover, the lengths of the power cables of the electrical devices are limited to limit the disposed positions of the electrical devices. Thus, the disposed positions of the electrical devices cannot satisfy the users' needs.

Extension cords can effectively solve the problems above. However, for connecting more power cables of more electrical devices, the power cables on the extension cords are disordered and unsightly. Especially, when the power cables are placed on a desktop, the desktop is cluttered.

In view of the drawbacks of the actual used extension cords at present, the invention is developed.

SUMMARY

One of main aspects is to provide a standing structure for a shell of an extension cord to laterally erect an extension cord. Therefore, power outlets and power cables inserted into the power outlets can be hidden on the back of the shell of the extension cord to make the desktop neat and beautiful.

The standing structure for a shell of an extension cord comprises:

a shell of an extension cord framed by a pair of opposite first surfaces and a pair of opposite second surfaces, wherein one of the second surfaces has at least two power outlets, and the first surfaces have intercalating trenches near the peripheral edges of the other of the two second surfaces; and a support frame having a bottom plate, a support plate connecting to the bottom plate, and two intercalating strips disposed on a surface of the support plate toward the shell of the extension cord to be corresponding to the intercalating trenches, wherein the bottom plate can be affixed to a flat plane, the support plate extends upward to be erected, and an angle is formed between the bottom plate and the support plate, whereby the intercalating strips can be intercalated into the intercalating trenches of the shell of the extension cord to combine the support plate and the shell of the extension cord, and the shell of the extension cord is supported by the support plate to let the second surface of the shell of the extension cord to be facing away the support plate of the supporting frame to be in a lateral standing state.

The advantages of this invention includes:

The shell of the extension cord is supported by the support frame to let the surface having power outlets back to the support plate of the support frame to be in a lateral standing state. Therefore, the power outlets and the power cables inserted into the power outlets are positioned and hidden on the back side of the support plate of the support frame to keep the desktop clean and beautiful.

DETAILED DESCRIPTION

Figure 1:
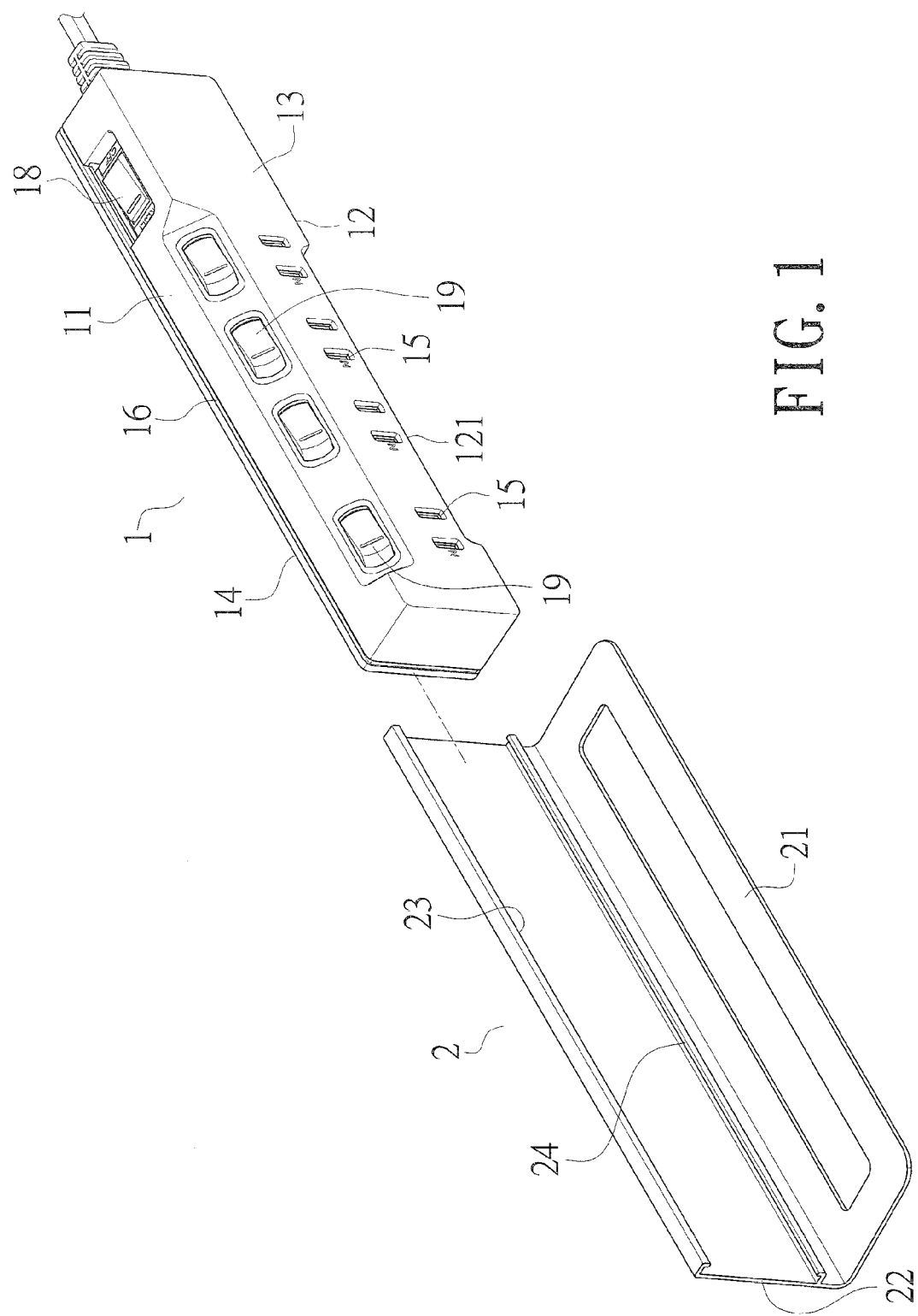
FIG. 1 is a perspective explosive diagram of an embodiment of this invention.

Please refer to FIG. 1.

The standing structure for a shell of an extension cord mainly comprises a shell 1 of an extension cord and a support frame 2.

Figure 8:
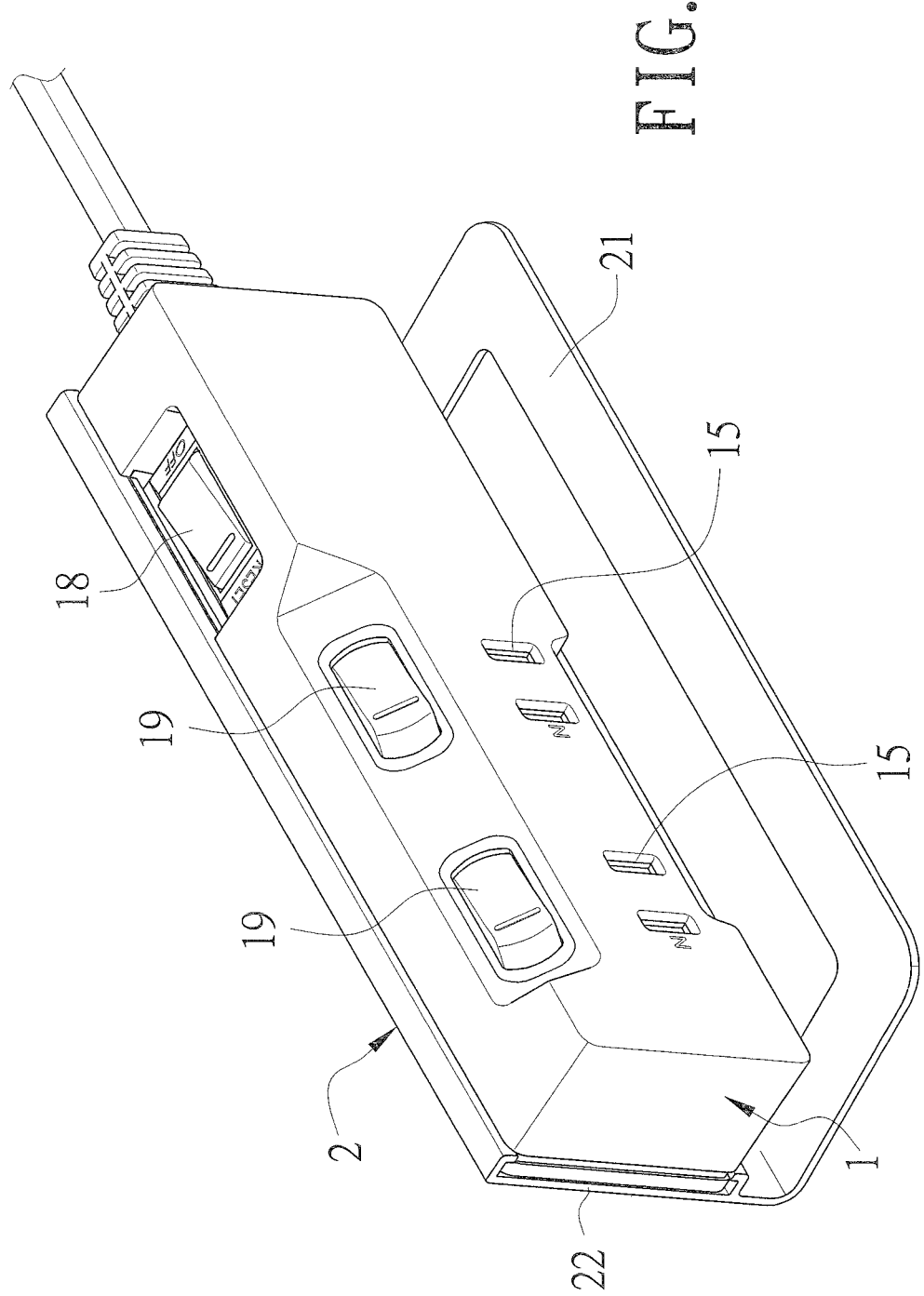
FIG. 8 is a perspective diagram showing a two-port extension cord according to an embodiment of this invention.
Figure 9:
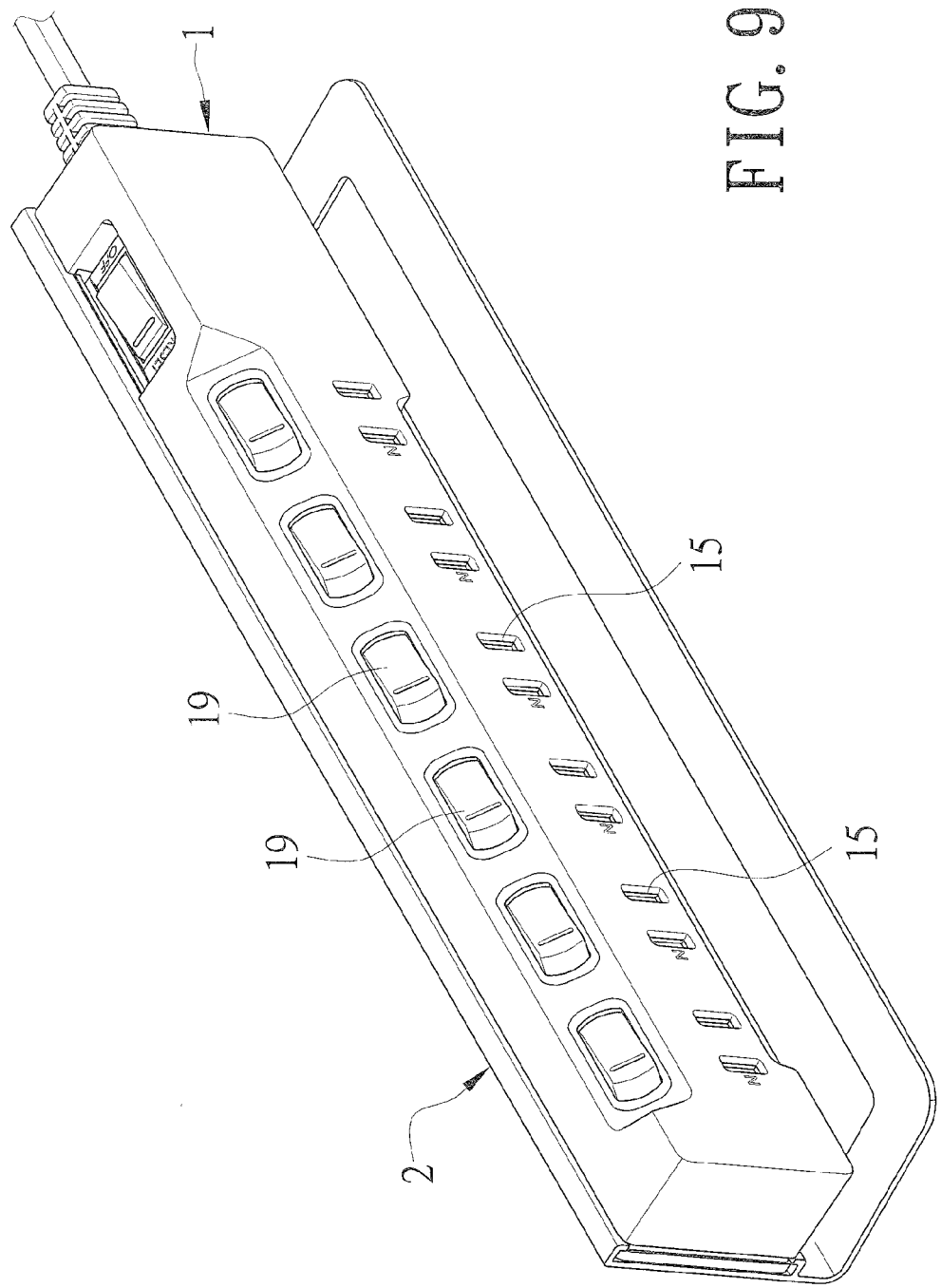
FIG. 9 is a perspective diagram showing a six-port extension cord according to an embodiment of this invention.
Figure 10:
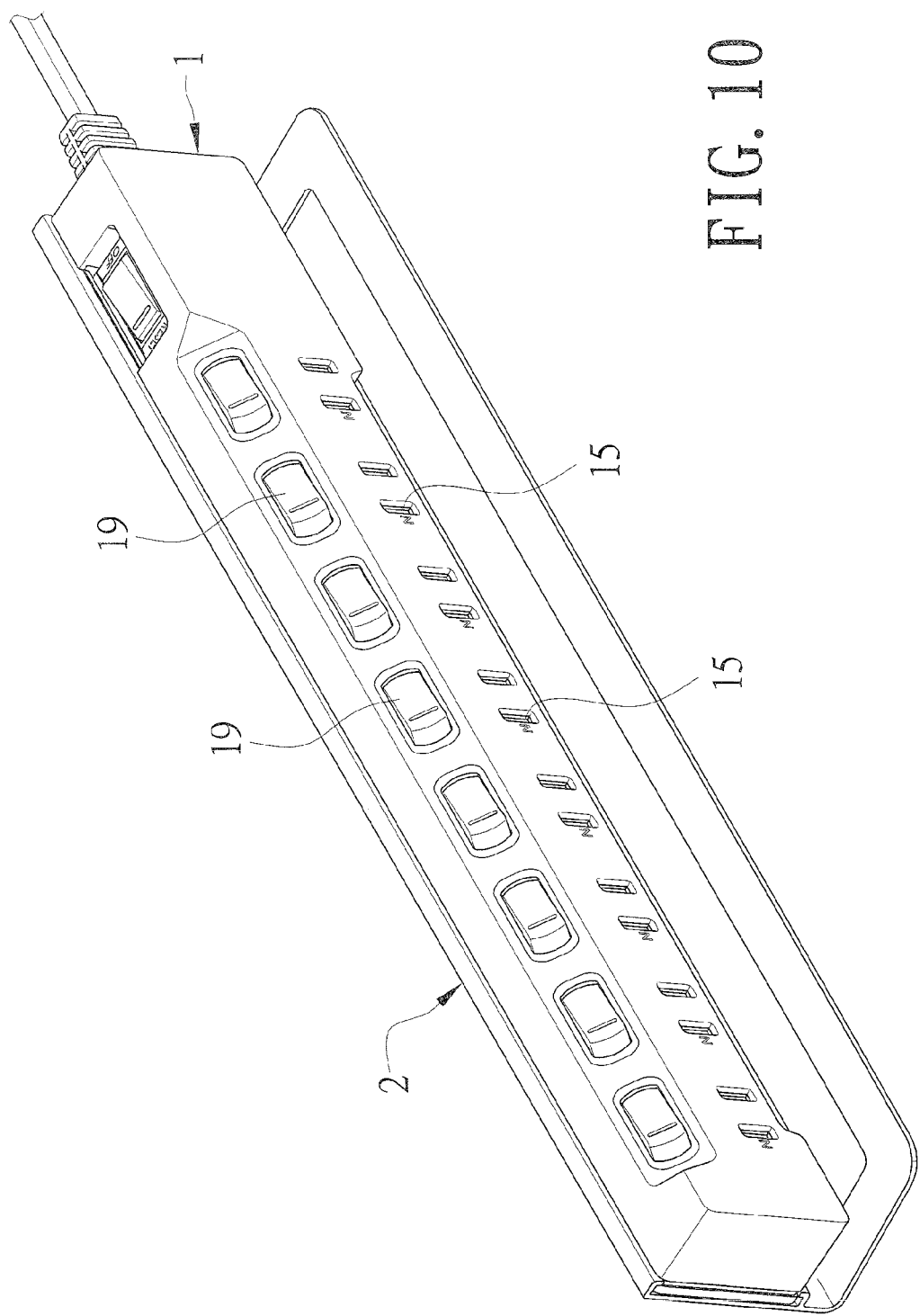
FIG. 10 is a perspective diagram showing an eight-port extension cord according to an embodiment of this invention.

The shell 1 of the extension cord has two opposite first surfaces 11 and 12, as well as two opposite second surfaces 13 and 14 to frame the shell 1 of the extension cord together. On the second surface 13, more than two power outlets 15 are disposed, such as four power outlets 15 in FIG. 1, two power outlets 15 in FIG. 8, six power outlets 15 in FIG. 9, and eight power outlets 15 in FIG. 10. The power outlet 15 can have two or three holes. On the first surfaces 11 and 12, two intercalating trenches 16 and 17 are disposed along the edges of the second surface 14, as shown in FIG. 4.

The support frame 2 comprises a bottom plate 21 affixed to a flat plane, and a support plate 22 connecting to one edge of the bottom plate 21. The support plate 22 extends upward to be erected, and an angle is formed between the bottom plate 21 and the support plate 22. On the surface of the support plate 22 toward the shell 1 of the extension cord, two intercalating strips 23 and 24 are disposed to be respectively corresponding to the intercalating trenches 16 and 17 of the shell 1.

Figure 2:
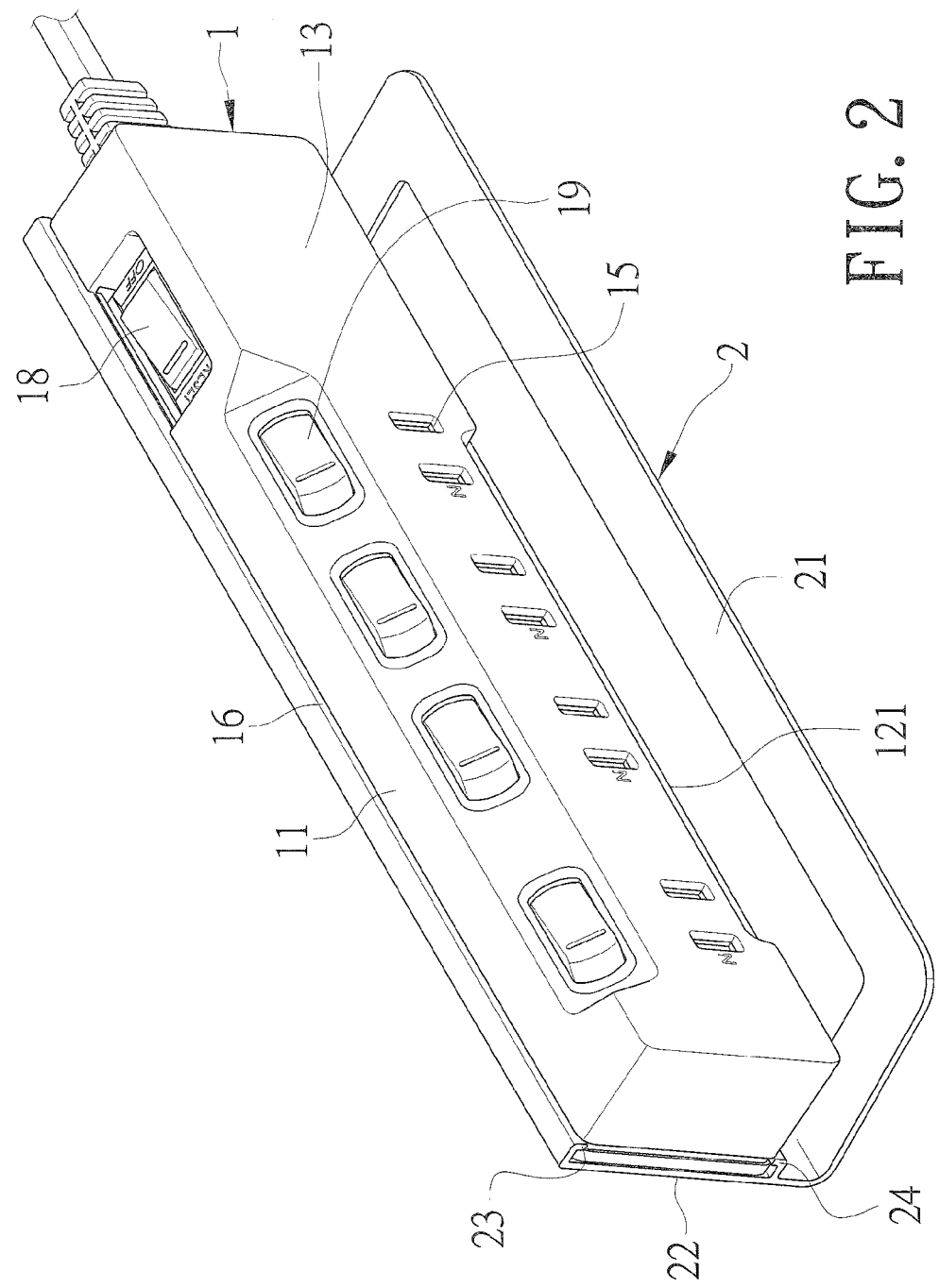
FIG. 2 is a perspective diagram of an embodiment of this invention.
Figure 3:
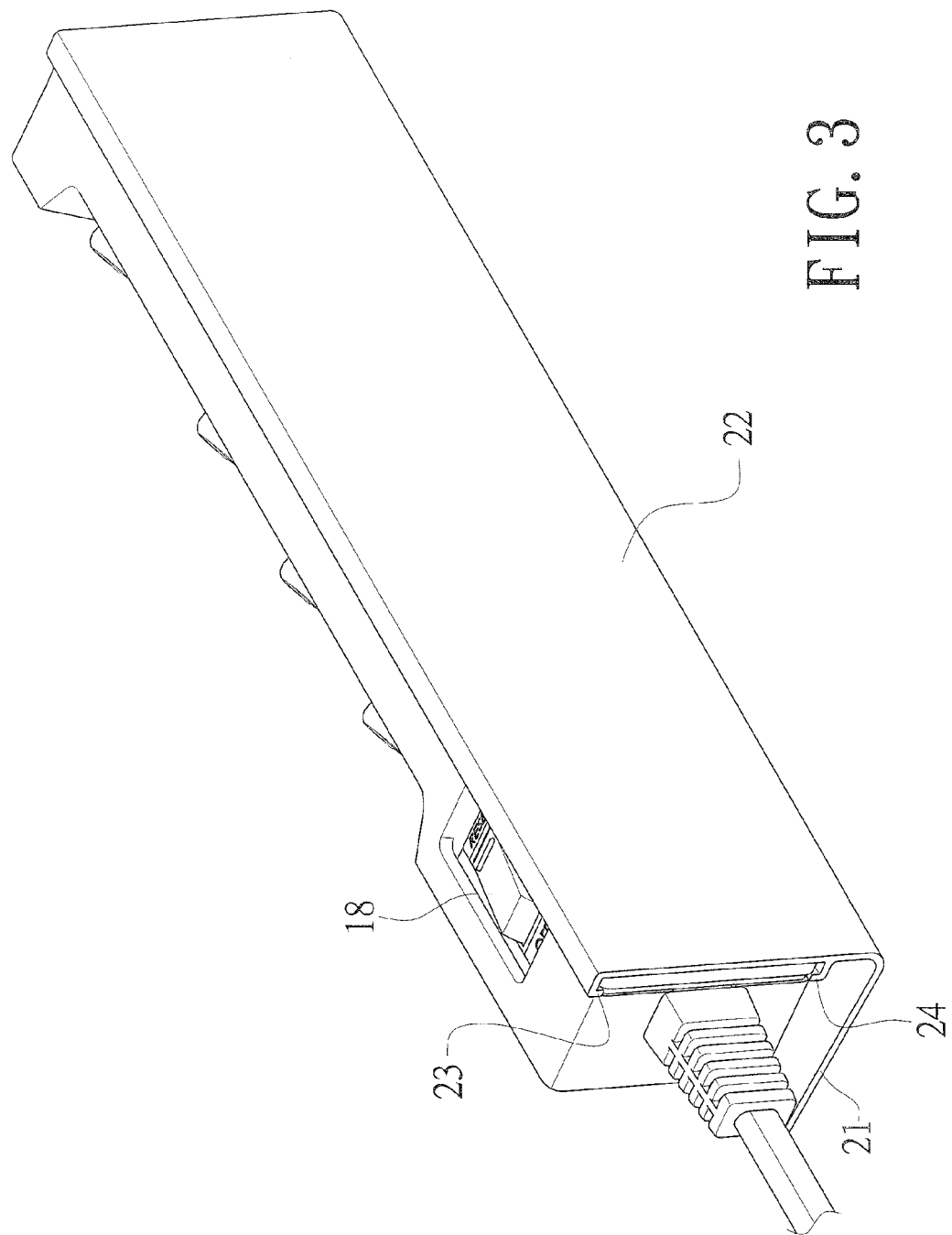
FIG. 3 is another perspective diagram of an embodiment of this invention.
Figure 4:
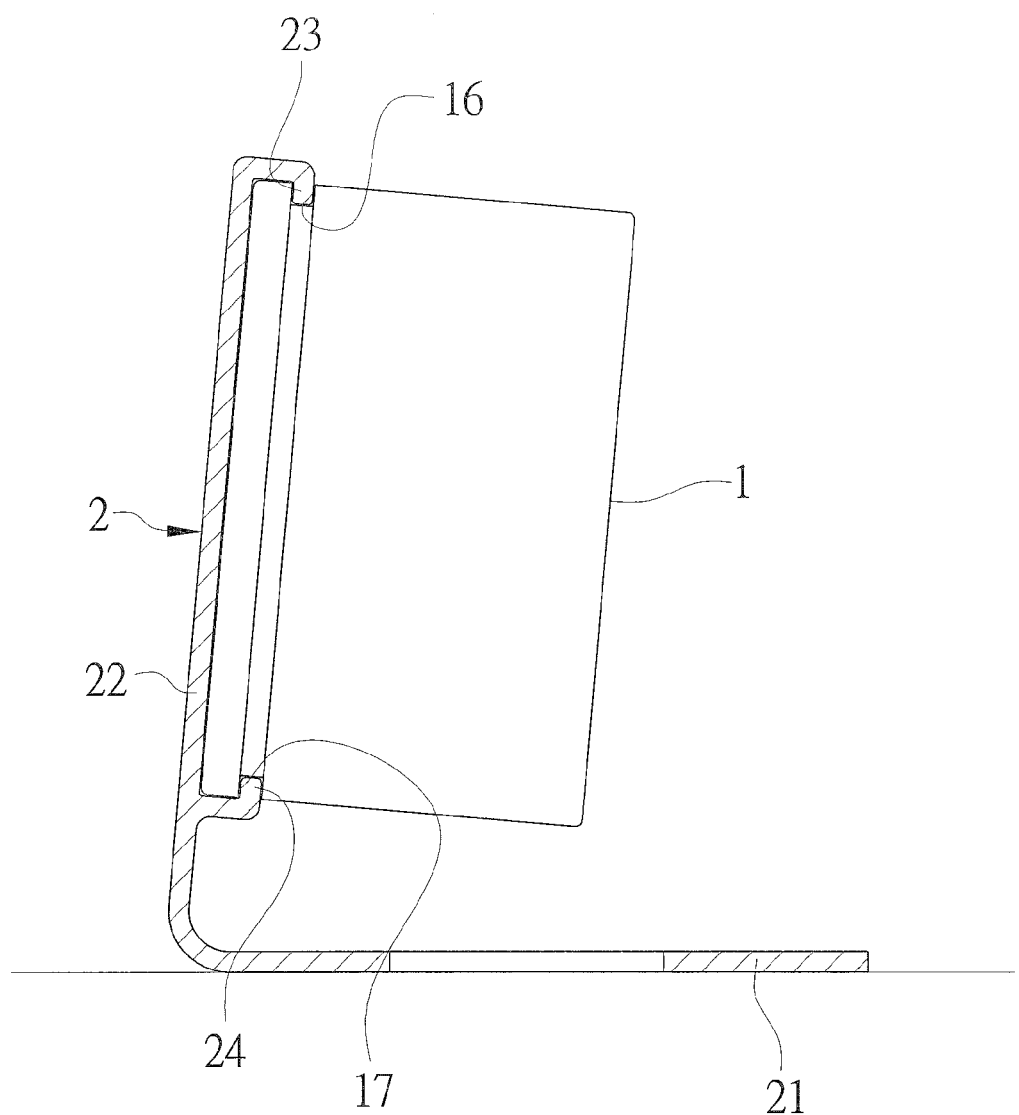
FIG. 4 is a side diagram of an embodiment of this invention.

Please refer to FIGS. 2-4. When assembling, the intercalating trenches 16 and 17 of the shell 1 are disposed to correspond the intercalating strips 23 and 24 of the support frame 2, and the shell 1 are laterally embedded into the support frame 2. Thus, the intercalating strips 23 and 24 of the support frame 2 are correspondingly intercalated into the intercalating trenches 16 and 17 to assemble the shell 1 of the extension cord on the support frame 2. At this time, the bottom plate 21 of the support frame 2 to flatly against a plane, such as a desktop, so that the shell 1 of the extension cord can be stably and laterally support on the plane to let the second surface 13 having the power outlets 15 of the shell 1 of the extension cord to be facing away from a user. Accordingly, the user cannot see the second surface 13 to create a neat and order using space for the user.

Please refer to FIG. 1 again. A main power switch 18 may be disposed on the shell 1 of the extension cord to control the on/off state of the power outlets 15. In a preferred embodiment, the main power switch 18 is disposed on the first surface 11.

Moreover, more than one power switches 19 may be disposed on the shell 1 of the extension cord, as shown in FIGS. 1 and 8-10. The number of the power switches 19 may be corresponding to the number of the power outlets 15, so that on/off state of each power outlet 15 may be independently controlled by each of the power switches 19.

Figure 11:
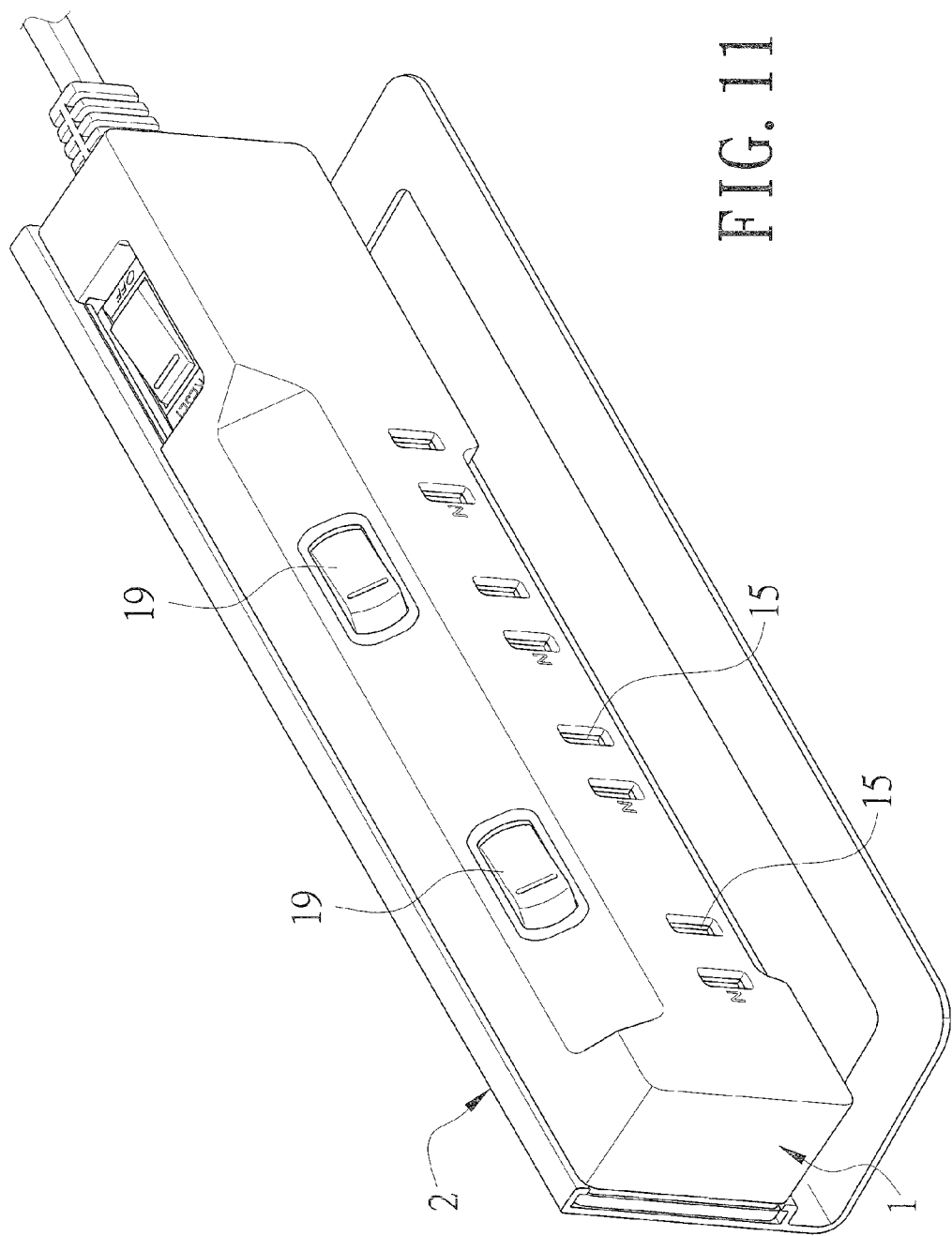
FIG. 11 is a perspective diagram showing an extension cord having power outlets twice the number of the power switches according to an embodiment of this invention.

Please refer to FIG. 11. The number of the power outlets 15 may be two times of the number of the power switches 19. One power switch 19 control the on/off state of two power outlets 15 at the same time.

Moreover, the number of the power outlets 15 may be three times of the number of the power switches 19. One power switch 19 control the on/off state of three power outlets 15 at the same time. Or, the number of the power outlets 15 may be four times of the number of the power switches 19. One power switch 19 control the on/off state of four power outlets 15 at the same time.

The power switches 19 may be disposed on the first surface 11 of the shell 1 of the extension cord, or on a junction between the first surface 11 and the second surface 13, as shown in FIG. 1.

Figure 12:
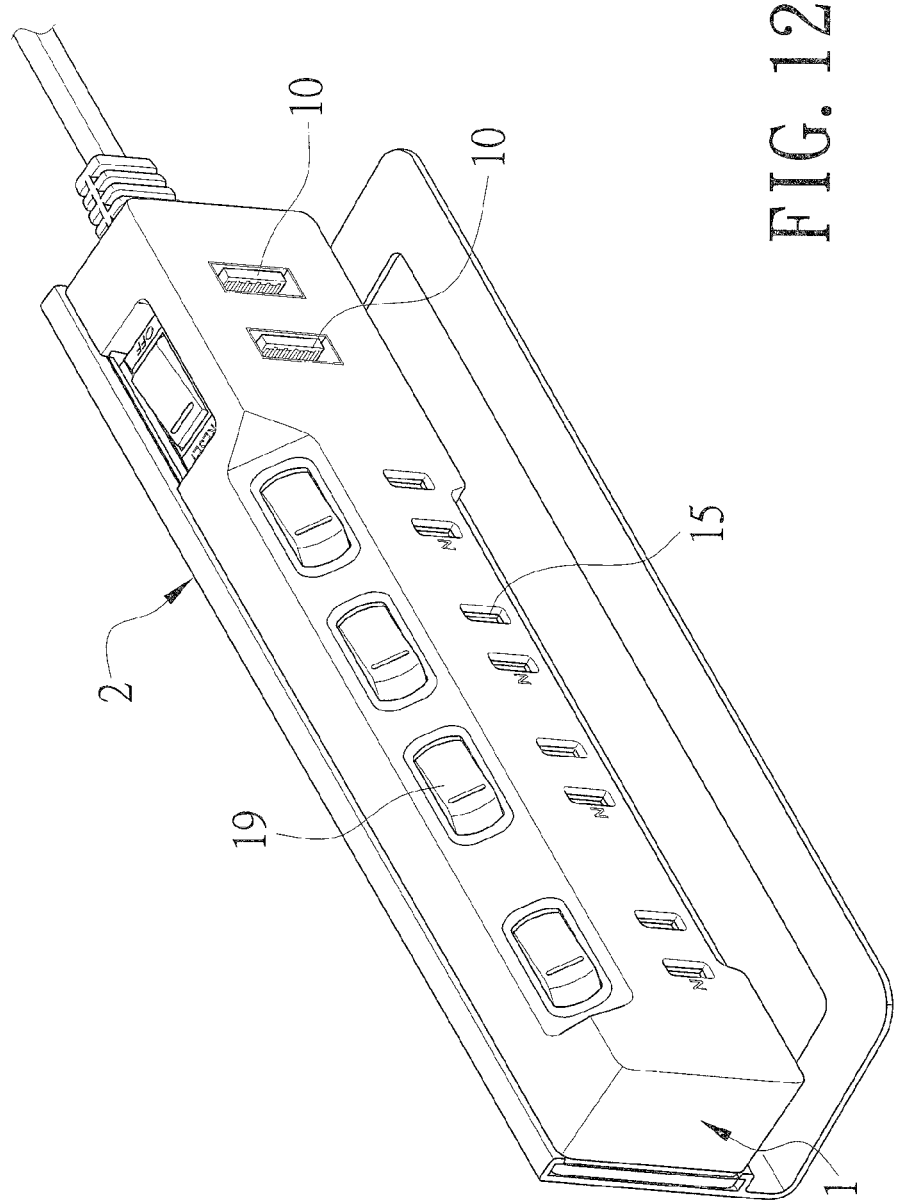
FIG. 12 is a perspective diagram showing an extension cord having USB slots according to an embodiment of this invention.

Furthermore, on the second surface 13 of the shell 1 of the extension cord, USB slots 10 may be further disposed for electric devices using USB terminal, as shown in FIG. 12. The on/off state of the USB slots 10 are controlled by the main power switch 18 or a power switch.

Figure 5:
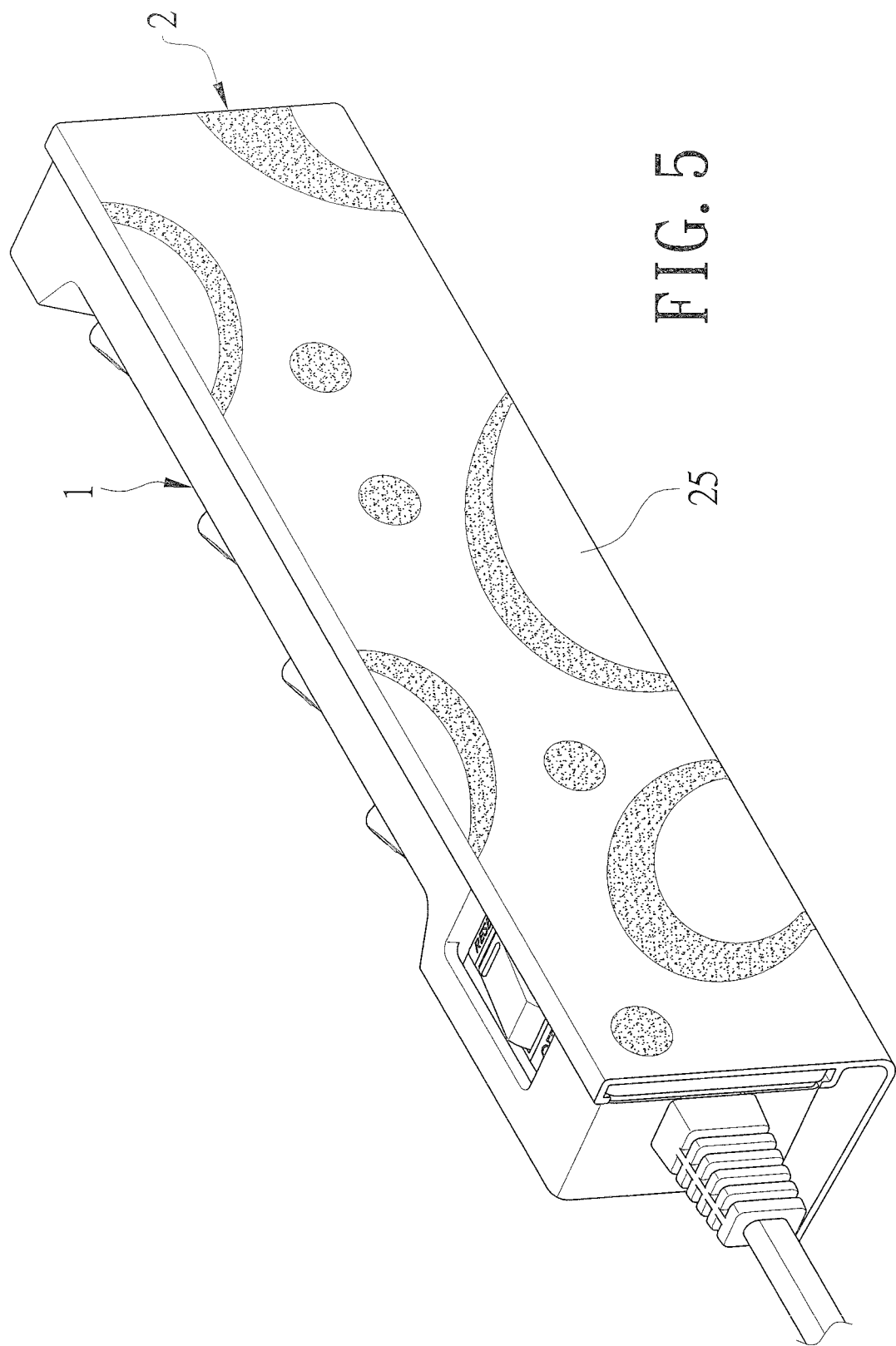
FIG. 5 is a perspective diagram showing a pattern layer on a support plate according to an embodiment of this invention.
Figure 6:
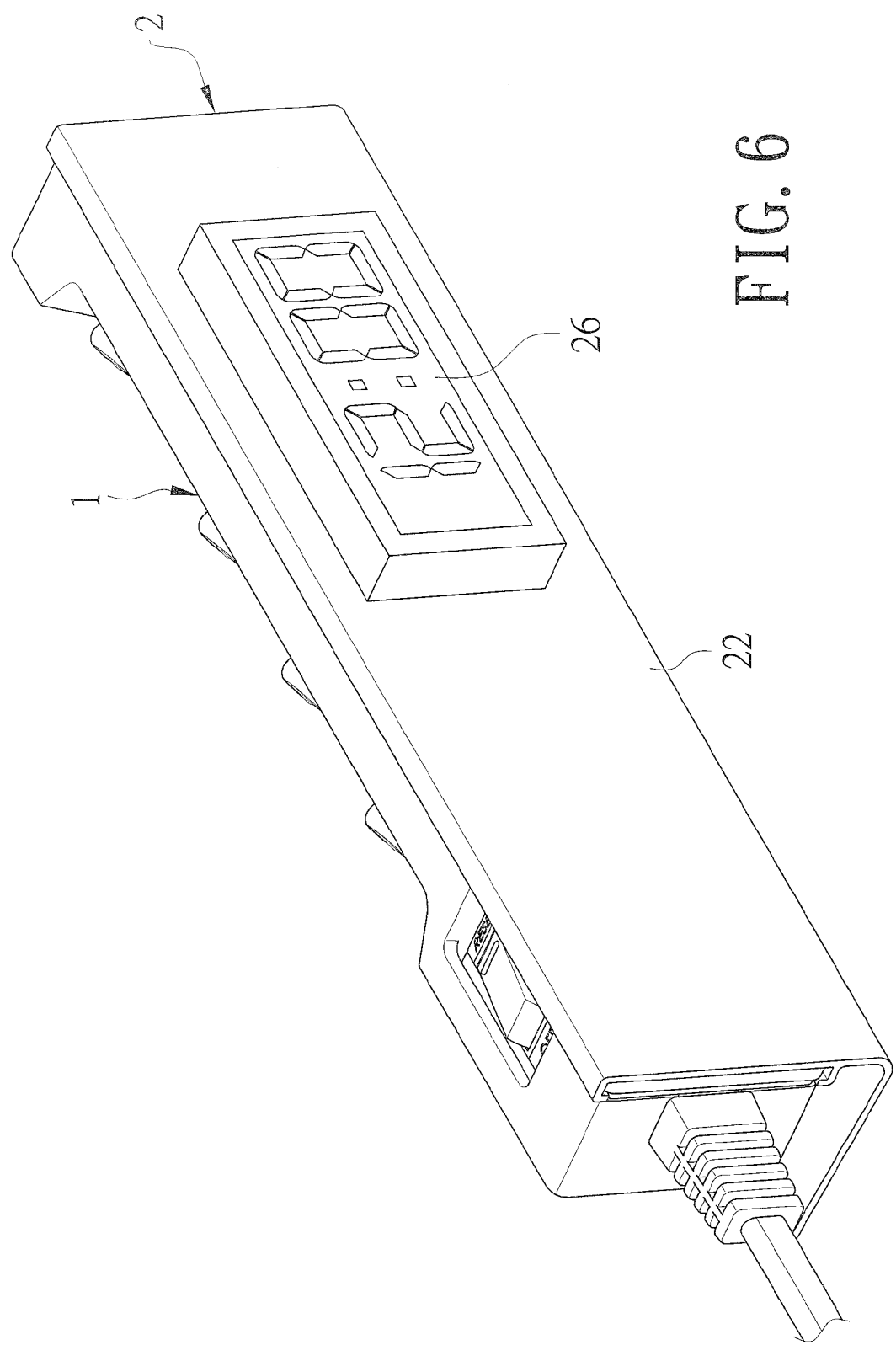
FIG. 6 is a perspective diagram showing a timer on a support plate according to an embodiment of this invention.
Figure 7:
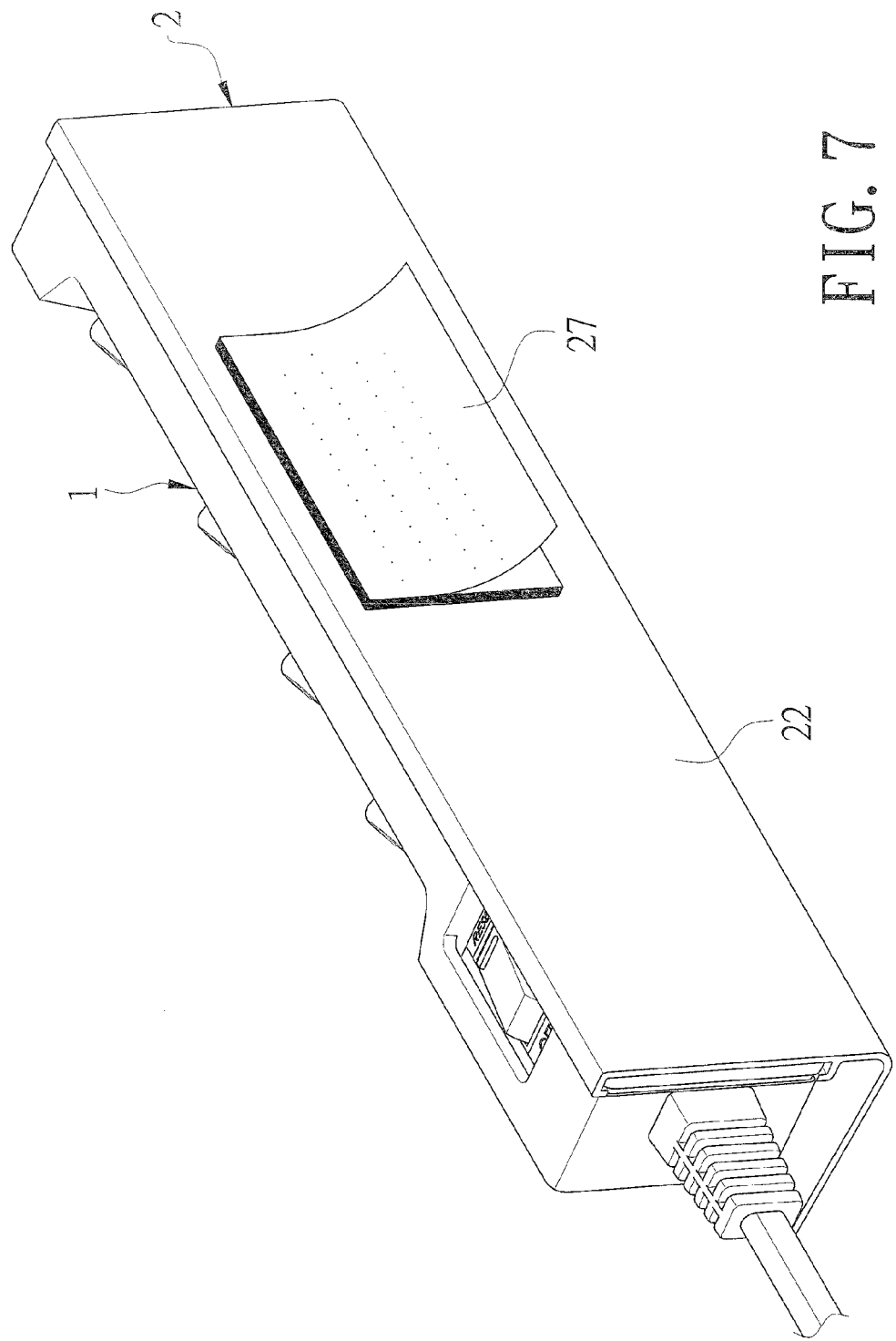
FIG. 7 is a perspective diagram showing a note paper on a support plate according to an embodiment of this invention.

In FIGS. 5-7, a pattern layer 25, a timer 26, or a note paper 27 is disposed on the support plate 22 of the support frame 2 far away from the shell 1 of the extension cord.

Please refer to FIG. 1 again. A recess part 121 is disposed on the other first surface 12 of the shell 1 of the extension cord. The recess part 121 is adjacent to one of the second surfaces (the second surface 13). The length of the recess part 121 covers the disposing area of the power outlets 15.

What is claimed is:

1. A standing structure for a shell of an extension cord, comprising:
   a shell of an extension cord framed by a pair of opposite first surfaces and a pair of opposite second surfaces, wherein a first of the second surfaces has at least two power outlets, and the first surfaces have intercalating trenches near respective peripheral edges of a second of the two second surfaces; and
   a support frame having a bottom plate, a support plate connecting to the bottom plate, and two intercalating strips disposed on a surface of the support plate toward the shell of the extension cord to be corresponding to the intercalating trenches, wherein the bottom plate can be affixed to a flat plane, the support plate extends upward to be erect, and an angle is formed between the bottom plate and the support plate,
   whereby the intercalating strips can be intercalated into the intercalating trenches of the shell of the extension cord to combine the support plate and the shell of the extension cord, and the shell of the extension cord is supported in a lateral standing state by the support plate with the second of the pair of second surfaces of the shell of the extension cord being disposed adjacent to the support plate of the supporting frame.

2. The standing structure of claim 1, wherein the shell of the extension cord comprises a main power switch.

3. The standing structure of claim 2, wherein one of first surfaces of the shell of the extension cord has a recess part adjacent to one of the second surfaces, and a length of the recess part being in correspondence with a length of a portion of the first of the second surfaces having the power outlets disposed thereon.

4. The standing structure of claim 2, wherein a surface of the support plate of the support frame away from the shell of the extension cord has at least one of a pattern layer, a timer, and a note paper.

5. The standing structure of claim 2, wherein the shell of the extension cord comprises at least one power switch.

6. The standing structure of claim 5, wherein one of first surfaces of the shell of the extension cord has a recess part adjacent to one of the second surfaces, and a length of the recess part being in correspondence with a length of a portion of the first of the second surfaces having the power outlets disposed thereon.

7. The standing structure of claim 5, wherein the shell of the extension cord includes a quantity of power outlets at least equal to a quantity of the power switches, each of the power switches controlling an on/off state of at least a corresponding one of the power outlets.

8. The standing structure of claim 7, wherein one of first surfaces of the shell of the extension cord has a recess part adjacent to one of the second surfaces, and a length of the recess part being in correspondence with a length of a portion of the first of the second surfaces having the power outlets disposed thereon.

9. The standing structure of claim 1, wherein the shell of the extension cord comprises at least one power switch.

10. The standing structure of claim 9, wherein one of first surfaces of the shell of the extension cord has a recess part adjacent to one of the second surfaces, and a length of the recess part being in correspondence with a length of a portion of the first of the second surfaces having the power outlets disposed thereon.

11. The standing structure of claim 9, wherein the shell of the extension cord includes a quantity of power outlets at least equal to a quantity of the power switches, each of the power switches controlling an on/off state of at least a corresponding one of the power outlets.

12. The standing structure of claim 11, wherein one of first surfaces of the shell of the extension cord has a recess part adjacent to one of the second surfaces, and a length of the recess part being in correspondence with a length of a portion of the first of the second surfaces having the power outlets disposed thereon.

13. The standing structure of claim 1, wherein one of first surfaces of the shell of the extension cord has a recess part adjacent to one of the second surfaces, and a length of the recess part being in correspondence with a length of a portion of the first of the second surfaces having the power outlets disposed thereon.

14. The standing structure of claim 1, wherein a surface of the support plate of the support frame away from the shell of the extension cord has at least one of a pattern layer, a timer, and a note paper.

\* \* \* \* \*